US009340064B2

(12) United States Patent
Kim et al.

(10) Patent No.: US 9,340,064 B2
(45) Date of Patent: May 17, 2016

(54) ARTIFICIAL MARBLE WITH TRANSPARENT AND AMORPHOUS PATTERN

(75) Inventors: Dong Hee Kim, Uiwang-si (KR); Eung Seo Park, Uiwang-si (KR); Chang Ho Son, Uiwang-si (KR)

(73) Assignee: Cheil Industries Inc., Gumi-si (KR)

( * ) Notice: Subject to any disclaimer, the term of this patent is extended or adjusted under 35 U.S.C. 154(b) by 797 days.

(21) Appl. No.: 13/530,148

(22) Filed: Jun. 22, 2012

(65) Prior Publication Data

US 2012/0258290 A1 Oct. 11, 2012

Related U.S. Application Data

(63) Continuation-in-part of application No. PCT/KR2010/007801, filed on Nov. 5, 2010.

(30) Foreign Application Priority Data

Dec. 23, 2009 (KR) .......... 10-2009-0129746
Oct. 15, 2010 (KR) .......... 10-2010-0100649

(51) Int. Cl.
| | | |
|---|---|---|
| B32B 3/10 | (2006.01) |
| B29C 41/22 | (2006.01) |
| B44F 9/04 | (2006.01) |
| C08L 33/06 | (2006.01) |
| C08L 33/14 | (2006.01) |
| C08L 33/16 | (2006.01) |
| C09D 4/00 | (2006.01) |
| C04B 26/06 | (2006.01) |
| C04B 26/14 | (2006.01) |
| C04B 26/16 | (2006.01) |
| C04B 111/54 | (2006.01) |
| C04B 111/80 | (2006.01) |

(52) U.S. Cl.
CPC . *B44F 9/04* (2013.01); *C04B 26/06* (2013.01); *C04B 26/14* (2013.01); *C04B 26/16* (2013.01); *C08L 33/068* (2013.01); *C08L 33/14* (2013.01); *C08L 33/16* (2013.01); *C09D 4/00* (2013.01); *C04B 2111/545* (2013.01); *C04B 2111/805* (2013.01); *C08L 2205/02* (2013.01); *Y10T 428/24802* (2015.01)

(58) Field of Classification Search
CPC .......................... B44F 9/04; C04B 2111/545
See application file for complete search history.

(56) References Cited

U.S. PATENT DOCUMENTS

2006/0267230 A1* 11/2006 Rha et al. .......... 264/39

FOREIGN PATENT DOCUMENTS

JP 2001-088146 A 4/2001
KR 10-1999-0058643 A 7/1999

(Continued)

OTHER PUBLICATIONS

International Search Report in counterpart International Application No. PCT/KR2010/007801 dated Jul. 28, 2011, pp. 1-4.

*Primary Examiner* — Ian Rummel
(74) *Attorney, Agent, or Firm* — Additon, Higgins & Pendleton, P.A.

(57) ABSTRACT

Artificial marble having a transparent amorphous pattern includes a base or matrix material portion and a transparent pattern portion. The pattern portion has a specific gravity or about 1.60 or more and is formed by hardening or curing a resin composition comprising a binder selected from halogenated urethane acrylates, halogenated epoxy acrylates and combinations thereof and an acrylic polymerizable monomer.

10 Claims, 3 Drawing Sheets

(56) References Cited

FOREIGN PATENT DOCUMENTS

| KR | 10-2003-0067600 A | 8/2003 |
| KR | 10-2009-0047837 A | 5/2009 |
| WO | WO 2008013345 A1 * | 1/2008 |
| WO | 2011/078476 A2 | 6/2011 |

* cited by examiner amorphous pattern part matrix amorphous pattern part matrix

ARTIFICIAL MARBLE WITH TRANSPARENT AND AMORPHOUS PATTERN

CROSS-REFERENCE TO RELATED APPLICATIONS

This application is a continuation-in-part of International Application No. PCT/KR2010/007801, filed Nov. 5, 2010, pending, which designates the U.S., published as WO 2011/078476, and is incorporated herein by reference in its entirety, and claims priority therefrom under 35 USC Section 120. This application also claims priority under 35 USC Section 119 from Korean Patent Application No. 10-2009-0129746, filed Dec. 23, 2009, and Korean Patent Application No. 10-2010-0100649, filed Oct. 15, 2010, in the Korean Intellectual Property Office, the entire disclosure of each of which is also incorporated herein by reference.

FIELD OF THE INVENTION

The present invention relates to an artificial marble having a transparent amorphous pattern.

BACKGROUND OF THE INVENTION

Artificial marble used as architectural materials may be classified into two groups according to the base resin material. One group represents acrylic artificial marble, and the other group represents unsaturated polyester artificial marble. Acrylic artificial marble has found wide utilization as a material for kitchen countertops, wash basins, dressing tables, bathtubs, various table surfaces, wall materials, interior articles, and the like, because it has an excellent appearance, high-gloss texture, and good weather resistance.

Various methods have been proposed for preparing an artificial marble having an amorphous pattern, such as mixing various synthetic materials having different colors and pouring the mixed composition in the liquid phase into a molding cell. Such methods, however, can provide only an artificial marble with a two-dimensional image because the parts forming the pattern of the artificial marble are not transparent.

Transparent resins such as acrylic, styrenic, and carbonate resins can be used in order to provide transparency to parts forming a pattern in the artificial marble. However, the transparent resin forming pattern parts in the artificial marble can shrink more than a matrix resin including lots of fillers surrounding the pattern parts during the hardening (curing) process. This can result in cracking at the interface of the pattern part and the matrix, which is also referred to as a concave phenomenon.

Further, the pattern part may migrate to an upper portion of the artificial marble in the hardening process because of the excessive difference between the specific gravity of the matrix resin and the pattern part. Because either surface of the artificial marble can be used as the exposed surface in a product including the artificial marble, the migration of the pattern part can be problematic.

Inorganic fillers such as aluminum hydrate, barium sulfate, silica and the like can be introduced in order to increase the specific gravity at the level of matrix. This, however, can significantly decrease transparency of the pattern part.

It can also be difficult to control the refractive ratio of inorganic filler to control transparency because the size of the inorganic filler used in artificial marble may also affect transparency.

SUMMARY OF THE INVENTION

The present invention provides an artificial marble that can have a transparent amorphous pattern, can represent a natural three-dimensional pattern, and can prevent the occurrence of the concave phenomenon. The artificial marble can also have good surface smoothness.

In exemplary embodiments, the artificial marble having an amorphous pattern comprises a base or matrix and a pattern part, wherein the pattern part has a specific gravity of about 1.6 to about 2.0.

In exemplary embodiments of the present invention, the pattern part is formed by hardening (also referred to herein as curing) a pattern part forming resin composition (A) comprising a binder and an acrylic polymerizable monomer. The binder is a halogenated urethane acrylate, halogenated epoxy acrylate, or a combination thereof.

The pattern part forming resin composition (A) includes about 50 to about 90 parts by weight of the binder and about 10 to about 50 parts by weight of the acrylic polymerizable monomer, based on the total weight of the pattern part forming resin composition.

The pattern part forming resin composition (A) can further include a reactive monomer in an amount of about 1 to about 100 parts by weight based on about 100 parts by weight of the acrylic polymerizable monomer.

The pattern forming resin composition (A) can further include an inorganic filler in an amount of about 0.1 to about 50 parts by weight based on about 100 parts by weight of a mixture of the binder and the acrylic polymerizable monomer.

The inorganic filler may be aluminum hydroxide.

The present invention further provides a method for preparing an artificial marble having an amorphous pattern. The method comprises:

mixing an acrylic polymerizable monomer with a binder including an halogenated urethane acrylate, halogenated epoxy acrylate or a combination of thereof to prepare a pattern part forming resin composition (A);

mixing a dissolved polyacrylate and an acrylic monomer to prepare a matrix forming slurry (B) for forming the matrix of the artificial marble;

non-uniformly supplying both of the pattern part forming resin composition (A) and the matrix forming slurry (B) into a molding cell; and hardening (or curing) the composition and slurry.

The artificial marble having a transparent amorphous pattern can have good smoothness without the occurrence of the concave phenomenon, and thus can provide a natural three-dimensional pattern.

DETAILED DESCRIPTION OF THE INVENTION

Figure 1:
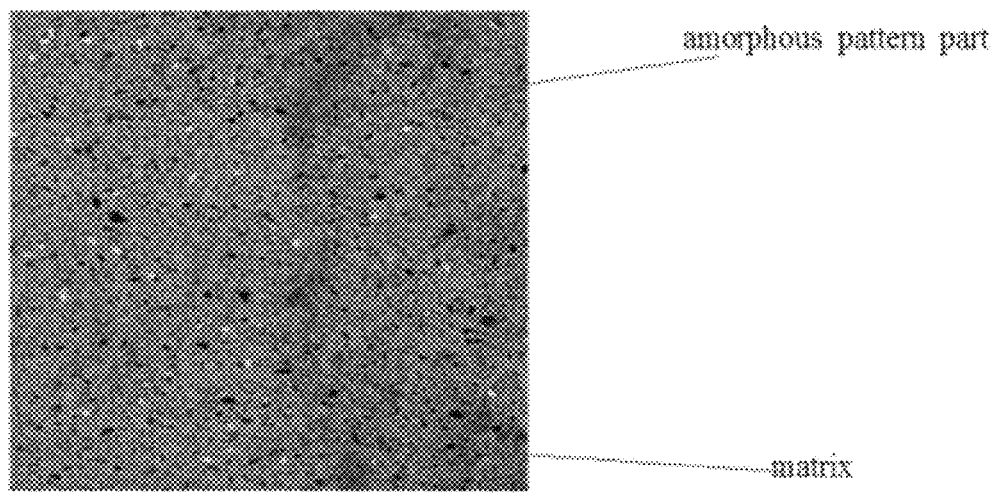
FIG. 1 is a picture representing an artificial marble of the prior art which has an amorphous pattern without transparency.

The present invention will be described more fully hereinafter in the following detailed description of the invention, in which some but not all embodiments of the invention are described. Indeed, this invention may be embodied in many different forms and should not be construed as limited to the embodiments set forth herein; rather, these embodiments are provided so that this disclosure will satisfy applicable legal requirements.

The artificial marble of the present invention includes a matrix and a pattern part distributed within the matrix. The pattern part can have a transparency of more than about 70% and a specific gravity of about 1.6 to about 2.0.

In an exemplary embodiment of the invention, the pattern part is prepared by hardening (curing) a resin composition (A) comprising a binder and an acrylic polymerizable monomer, and the matrix of the artificial marble is prepared by hardening a matrix forming slurry (B) which is a mixture of dissolved polyacrylate and acrylic monomer.

(A) Pattern Part Forming Resin Composition

A pattern part forming resin composition (A) comprises a binder and an acrylic polymerizable monomer. In an exemplary embodiment of the present invention, the pattern part forming resin composition may comprise about 50 to about 90 parts by weight of the binder and about 10 to about 50 parts by weight of the acrylic polymerizable monomer based on the total weight of the pattern part forming resin composition (A).

In some embodiments, the pattern part forming resin composition (A) can include the binder in an amount of about 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, or 90 parts by weight. Further, according to some embodiments of the present invention, the amount of binder can be in a range from about any of the foregoing amounts to about any other of the foregoing amounts.

In some embodiments, the pattern part forming resin composition (A) can include the acrylic polymerizable monomer in an amount of about 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 parts by weight. Further, according to some embodiments of the present invention, the amount of acrylic polymerizable monomer can be in a range from about any of the foregoing amounts to about any other of the foregoing amounts.

If the amount of binder used is less than about 50 parts by weight, the specific gravity of the pattern part may be increased or the ratio of shrinkage may be decreased. If the amount of binder used is more than about 90 parts by weight, viscosity may be increased so that process efficiency may be deteriorated.

Examples of the binder can include without limitation halogenated urethane acrylates, halogenated epoxy acrylates, and the like, and combinations of thereof. Exemplary halogenated urethane acrylates and halogenated epoxy acrylates are known in the art and are commercially available. The halogenated epoxy acrylate binder can have a number average molecular weight of about 1,000 to about 4,000.

Transparent resins such as acrylic, styrenic, and carbonate resins can be used to impart transparency to parts forming a pattern in an artificial marble. However, such transparent resins used for pattern parts can shrink more than the matrix during the hardening process, and, as a result, the concave phenomenon may occur as mentioned above. Also, the viscosity of the pattern parts can be lower than that of the matrix so that the pattern parts can migrate to the upper parts or regions of the artificial marble during the hardening process. The pattern parts can also migrate to the upper part or regions of the artificial marble during the hardening process because there can be a significant difference between the specific gravities of the matrix and the pattern parts. Because the rear side of the artificial marble can be surface treated after the hardening step and used as the exposed surface in the final product, the migration of the pattern part is not desirable.

In order to solve the above problems, the present inventors have introduced a halogenated compound having a high specific gravity, such as a halogenated urethane acrylate or halogenated epoxy acrylate, with an acrylic polymerizable monomer. This can increase the specific gravity of the pattern parts to minimize or eliminate migration thereof to upper regions or parts of the artificial marble during the hardening process. Also, the pattern parts may shrink less than the other resins in the hardening process, and as a result, it is possible to balance the shrinkage between the pattern parts and the matrix.

A concave phenomenon may occur when the affinity between the matrix and pattern part is weak. However, a primary reason for the concave phenomenon is the difference in the shrinkage ratio rather than the affinity between the matrix and pattern parts when using the same kind of matrix and pattern parts.

In exemplary embodiments, the pattern parts can have a specific gravity of about 1.6 to about 2.0 in order to achieve a natural three-dimensional pattern and to prevent or minimize the occurrence of the concave phenomenon.

As a result, the present inventors have found that if a halogenated compound having a high specific gravity such as a halogenated urethane acrylate or halogenated epoxy acrylate is added in the hardening process, it is possible to control the shrinkage ratio difference between the matrix and the pattern part. As a result, artificial marble having a transparent amorphous pattern can be prepared by mixing the pattern part forming resin composition (A) and the matrix forming slurry (B) and hardening (curing) the composition (A) and slurry (B) at the same time.

The acrylic polymerizable monomer can increase cross-linking, and thus can help impart excellent strength to the resin composition. Examples of the acrylic polymerizable monomer include without limitation methyl (meth)acrylate, ethyl (meth)acrylate, 2-ethylhexyl (meth)acrylate, octyl (meth)acrylate, dodecyl (meth)acrylate, octadecyl (meth)acrylate, methylcyclohexyl (meth)acrylate, isobornyl (meth)acrylate, phenyl (meth)acrylate, benzyl (meth)acrylate, chlorophenyl (meth)acrylate, methoxyphenyl (meth)acrylate, bromophenyl (meth)acrylate, ethylene glycol di(meth)acrylate, 1,2-propylene glycol (meth)acrylate, 1,3-butanediol di(meth)acrylate, 1,3-propylene glycol (meth)acrylate, 1,4-butanediol di(meth)acrylate, 1,5-pentanediol di(meth)acrylate, neopentyl glycol di(meth)acrylate, diethylene glycol di(meth)acrylate, triethylene glycol di(meth)acrylate, dipropylene glycol di(meth)acrylate, diallyl terephthalate, diallyl phthalate, diallyl carbonate, trimethy-lolpropane tri(meth)acrylate, pentaerythritol tri(meth)acrylate, pentaerythritol tetra(meth)acrylate, dipentaerythritol hexa(meth)acrylate, ethoxy ethoxyethyl acrylate, epoxy acrylate of glycidyl methacrylic acid, 1,6-hexanediol di(meth)acrylate, glycerol tri(meth)acrylate, methylpropanediol di(meth)acrylate, polyethylene glycol di(meth)acrylate, and the like, and combinations thereof.

The pattern part forming resin composition (A) optionally further may comprise a reactive monomer to impart compatibility. The reactive monomer can be an aromatic vinyl monomer, such as a styrene monomer. Examples of styrene monomers include without limitation styrene, α-methylstyrene, β-methylstyrene, p-methylstyrene, p-t-butylstyrene, ethylstyrene, vinylxylene, halogenated styrene monomers (such as monochlorostyrene, dichlorostyrene, and dibromostyrene), and the like, and combinations thereof. The styrene monomer can improve compatibility and solubility. A halogenated styrene monomer can be used taking into consideration into the kind of binder used.

In an exemplary embodiment of the present invention, if a brominated urethane acrylate is used as a binder (such as used in the following examples), a bromo styrene can be used as a reactive monomer in order to improve compatibility and solubility.

When the reactive monomer is introduced into the acrylic polymerizable monomer, the reactive monomer can be included in an amount of about 1 to about 100 parts by weight based on about 100 parts by weight of the acrylic polymerizable monomer. In some embodiments, the reactive monomer can be used in an amount of about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99 or 100 parts by weight. Further, according to some embodiments of the present invention, the amount of reactive monomer can be in a range from about any of the foregoing amounts to about any other of the foregoing amounts.

In an exemplary embodiment of the present invention, the pattern part forming resin composition may optionally further comprise an inorganic filler in an amount of about 0 to about 100 parts by weight, for example about 0.1 to about 50 parts by weight, based on about 100 parts by weight of a mixture of the binder and the acrylic polymerizable monomer.

In some embodiments, the pattern part forming resin composition may include the inorganic filler in an amount of 0 (the inorganic filler is not present), about 0 (the inorganic filler is present), 0.1, 0.2, 0.3, 0.4, 0.5, 0.6, 0.7, 0.8, 0.9, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99 or 100 parts by weight. Further, according to some embodiments of the present invention, the amount of inorganic filler can be in a range from about any of the foregoing amounts to about any other of the foregoing amounts.

The inorganic filler can help increase the specific gravity of the pattern part and can also help decrease the shrinkage ratio at the level of (interface with) the matrix during the hardening process.

The inorganic filler may be included in the artificial marble in an amount selected to minimize or prevent deteriorating transparency. For example, the inorganic filler can be included in an amount of about 30 parts by weight or less, based on about 100 parts by weight of a mixture of the binder and the acrylic polymerizable monomer to provide good transparency. In some embodiments, the mixture of the binder and the acrylic polymerizable monomer may include the inorganic filler in an amount of about 0.1, 0.2, 0.3, 0.4, 0.5, 0.6, 0.7, 0.8, 0.9, 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30 parts by weight. Further, according to some embodiments of the present invention, the amount of inorganic filler can be in a range from about any of the foregoing amounts to about any other of the foregoing amounts.

Examples of the inorganic filler may include without limitation inorganic powder such as calcium carbonate, aluminum hydroxide, silica, alumina, barium sulfate, magnesium hydroxide and the like, and combinations thereof. The size of the inorganic filler may be about 1 to about 100 μm.

Among the inorganic powders, aluminum hydroxide may impart an excellent appearance and transparency to an artificial marble.

The pattern part forming resin composition may further include one or more additives such as a colorant, defoaming agent, coupling agent, ultraviolet absorber, light diffusing agent, polymerization inhibitor, antistatic agent, retardant, heat stabilizer and the like and combinations thereof.

The colorant can impart color to the transparent pattern, which can help provide an artificial marble representing a 3-dimensional natural pattern and various colors.

(B) Matrix Forming Slurry of the Artificial Marble

A matrix forming slurry (B) of the present invention may comprise an acrylic resin syrup prepared by dissolving a polyacrylate into acrylic monomer.

Examples of the acrylic monomer include without limitation methyl methacrylate, ethyl methacrylate, isopropyl methacrylate, n-butyl methacrylate, 2-ethyl hexyl methacrylate and the like, and combinations thereof. In exemplary embodiments, the acrylic monomer is methyl methacrylate.

Examples of the polyacrylate include without limitation a polymer of one or more of the acrylic monomers as noted herein. In exemplary embodiments, the polyacrylate is polymethylmethacrylate.

The acrylic resin syrup may comprise about 65% to about 99% by weight of the acrylic monomer and about 1% to about 35% by weight of the polyacrylate.

The matrix forming slurry further may comprise one or more additives such as but not limited to marble chips in different sizes, inorganic filler, cross-linking agents, colorants, defoaming agents, coupling agents, ultraviolet absorbers, light diffusing agents, polymerization inhibitors, antistatic agents, flame retardants, heat stabilizers and the like, and combinations thereof, taking into consideration the desired properties of the final product.

The present invention also provides a method of preparing an artificial marble having an amorphous pattern. In the present invention, the method of preparing an artificial marble comprises mixing an acrylic polymerizable monomer with a binder selected from halogenated urethane acrylates, halogenated epoxy acrylates, and combinations thereof to prepare a pattern part forming resin composition (A); dissolving polyacrylate into acrylic monomer to prepare a matrix forming slurry (B); non-uniformly supplying both of the pattern part forming resin composition (A) and the matrix forming slurry (B) into a molding cell; and hardening (curing) the composition (A) and slurry (B).

As used herein, the term "non-uniformly" refers to supplying composition (A) and slurry (B) to a mold in an irregular or non-uniform manner using techniques known in the art so that the resultant product includes irregularly shaped patterns dispersed within the matrix resin. Examples of techniques known in the art for non-uniformly feeding a composition (A) and slurry (B) include without limitation using different composition and slurry viscosities, feed rates, and/or specific line mixer configurations, among others, and the present invention is not limited to any particular technique or combination of techniques. As will be appreciated by the skilled artisan, an artificial marble with irregularly shaped patterns dispersed within the matrix resin can more closely resemble the appearance of natural marble. In contrast, an artificial marble with substantially uniformly shaped patterns dispersed within the matrix resin does not as closely resemble the appearance of natural marble.

Process conditions for making the artificial marble, such as curing times and temperatures, and the like, are known in the art and appropriate processing conditions will be appreciated by the skilled artisan without undue experimentation.

In an exemplary embodiment of the present invention, the pattern part forming resin composition (A) may comprise about 50 to about 90 parts by weight of the binder and about 10 to about 50 parts by weight, and optionally may further include about 0.1 to about 50 parts by weight of an inorganic filler.

There is no particular limitation to the type of inorganic filler that can be used. In exemplary embodiments, the inorganic filler can be aluminum hydroxide, which can impart an excellent appearance and transparency to an artificial marble.

The invention may be better understood by reference to the following examples which are intended for the purpose of illustration and are not to be construed as in any way limiting the scope of the present invention, which is defined in the claims appended hereto.

EXAMPLES

Example 1

A pattern part forming resin composition (A) is prepared by mixing a base resin composition comprising 85 parts by weight of brominated epoxy acrylate and 15 parts by weight of methyl methacrylate with 0.2 parts by weight of normal dodecyl mercaptan and 5 parts by weight of aluminum hydroxide based on 100 parts by weight of the base resin composition.

A matrix forming slurry (B) is prepared by mixing 100 parts by weight of a resin syrup (which includes polymethylmethacrylate dissolved into methylmethacrylate) with 140 parts by weight of aluminum hydroxide, 60 parts by weight of marble chips in different sizes, 1.5 parts by weight of trimethylpropanetriacrylate, 0.2 parts by weight of normal dodecyl mercaptan, and 1.0 parts by weight of calcium hydroxide.

The pattern part forming resin composition (A) and the matrix forming slurry (B) are respectively injected into a molding cell via feeding pipes at a volume ratio of 20:80. Additionally, 0.5 parts by weight of t-butyl peroxymaleate is mixed with 100 parts by weight of the resin composition (A) and the slurry (B) using a line mixer which is connected with feeding pipes. The resin composition (A) and slurry (B) are irregularly (non-uniformly) injected into the molding cells for forming an amorphous pattern, and then hardened (or cured) to prepared an artificial marble having an amorphous pattern.

Figure 2:
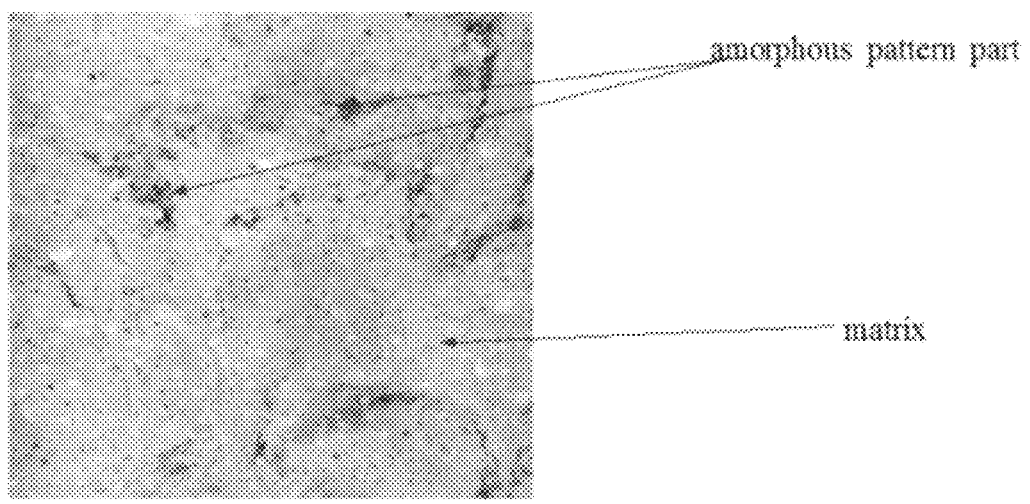
FIG. 2 is a picture representing a product of the artificial marble prepared according to Example 1.

The prepared artificial marble of example 1 is shown in FIG. 2.

Example 2

Figure 3:
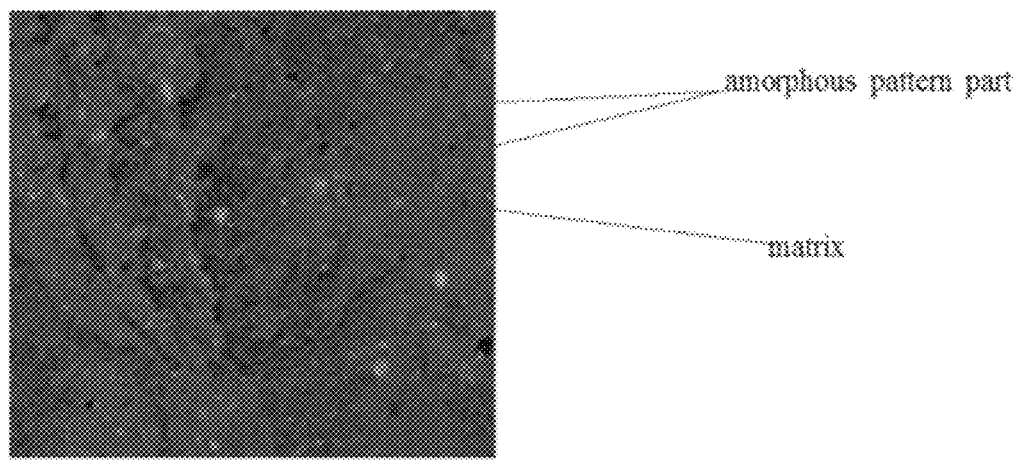
FIG. 3 is a picture representing a product of the artificial marble prepared according to Example 2.

Example 2 is conducted in the same manner as in Example 1, except that the pattern part forming resin composition (A) is prepared by mixing a resin composition comprising 85 parts by weight of brominated urethane acrylate and 5 parts by weight of bromo styrene, and 10 parts by weight of methylmethacrylate with 0.2 parts by weight of normal dodecyl mercaptan and 10 parts by weight of aluminum hydroxide based on 100 parts by weight of the resin composition. The prepared artificial marble of example 2 is shown in FIG. 3.

Example 3

Figure 4:
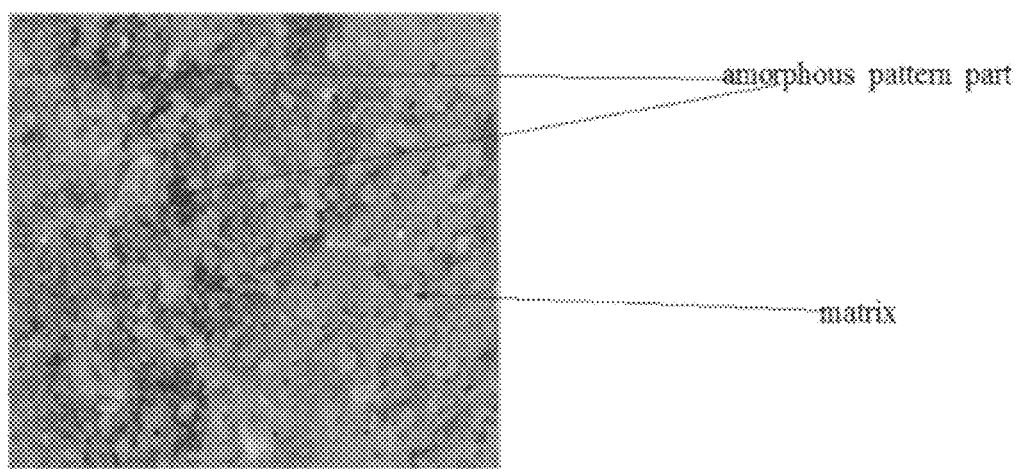
FIG. 4 is a picture representing a product of the artificial marble prepared according to Example 3.

Example 3 is conducted in the same manner as in Example 1, except that the pattern part forming resin composition (A) is prepared by mixing a resin composition comprising 80 parts by weight of brominated epoxy acrylate and 5 parts by weight of styrene, and 15 parts by weight of methyl methacrylate with 0.2 parts by weight of normal dodecyl mercaptan and 15 parts by weight of aluminum hydroxide based on 100 parts by weight of the resin composition. The prepared artificial marble of example 3 is shown in FIG. 4.

Comparative Example 1

Figure 5:
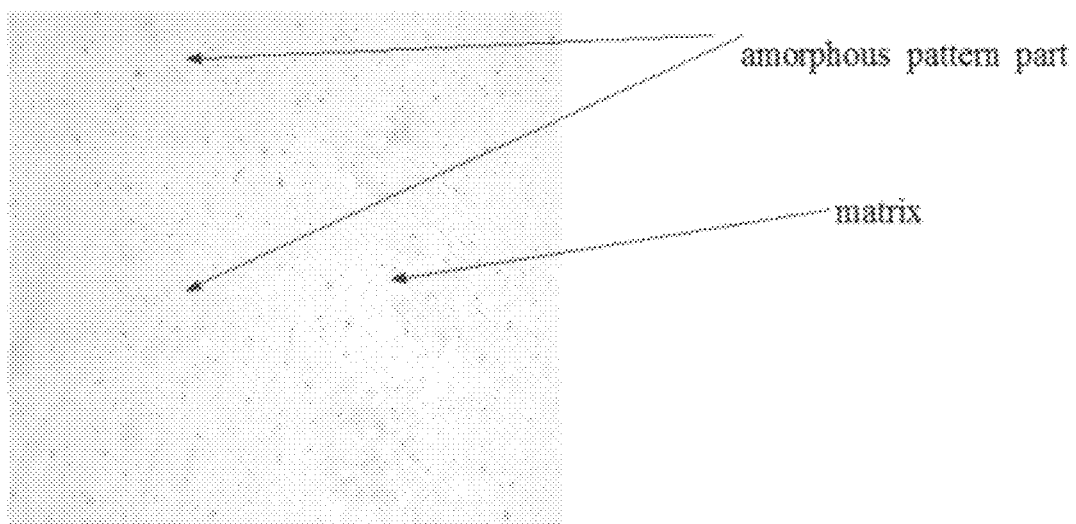
FIG. 5 is a picture representing a product of the artificial marble prepared according to Comparative Example 1.

Comparative Example 1 is conducted in the same manner as in Example 1, except that the pattern part forming resin composition (A) is prepared by mixing 100 parts by weight of a resin syrup (which includes polymethylmethacrylate dissolved into methylmethacrylate) with 140 parts by weight of aluminum hydroxide, 1.5 parts by weight of trimethylpropanetriacrylate, 0.2 parts by weight of normal dodecyl mercaptan, and 1.0 parts by weight of calcium hydroxide. The prepared artificial marble of comparative example 1 is shown in FIG. 5.

Comparative Example 2

Comparative Example 2 is conducted in the same manner as in Example 1, except that the pattern part forming resin composition (A) is prepared by mixing 100 parts by weight of a resin syrup (which includes polymethylmethacrylate dissolved into methylmethacrylate) with 1.5 parts by weight of trimethylpropanetriacrylate, 0.2 parts by weight of normal-dodecyl mercaptan, and 1.0 parts by weight of calcium hydroxide.

Comparative Example 3

Comparative Example 3 is conducted in the same manner as in Example 1, except that the pattern part forming resin composition (A) is prepared by mixing a resin composition comprising 36 parts by weight of unsaturated polyester resin (Aekyung Chem. Co. of Korea, TP-145) and 64 parts by weight of styrene with 0.5 parts by weight of normal dodecyl mercaptan and 130 parts by weight of aluminum hydroxide based on 100 parts by weight of the resin composition.

Additionally, a resin composition is prepared by mixing a base resin composition comprising 36 parts by weight of unsaturated polyester resin (Aekyung Chem. Co. of Korea, TP-145) and 64 parts by weight of styrene with 0.5 parts by weight of normal dodecyl mercaptan and 0.5 parts by weight of t-butyl peroxymaleate based on 100 parts by weight of the resin composition. The composition is cured or hardened and the refractive ratio of the resin composition is measured as 1.57 which is similar to that of aluminum hydroxide Comparative Example 4

Comparative Example 4 is conducted in the same manner as in Example 1, except that the pattern forming resin composition (A) is prepared by mixing a vinyl ester resin (Aekyung Chem. Co. of Korea, DION-9120) comprising 60 parts by weight of epoxyacrylate oligomer and 40 parts by weight of styrene with 0.2 parts by weight of normal dodecyl mercaptan based on 100 parts by weight of the vinyl ester resin.

Specific gravity of the pattern part, transparency, and concave occurrence for examples 1-3 and comparative examples 1-4 are shown in Table 1.

Methods for Measuring Properties:

(1) Specific gravity of a pattern part: The pattern part of the artificial marble of examples 1-3 and comparative examples 1-4 is cut away and the specific gravity thereof is measured in accordance with ASTM D792.

(2) Transparency of a pattern part: The pattern part of the artificial marble of examples 1-3 and comparative examples 1-4 is cut away and sanded to a thickness of 1±0.3 mm. A mineral oil is then applied to both sides of the specimen, and slide-glasses are adhered on the specimen. Then, transparency is evaluated as total light transmittance in accordance with ASTM D1003.

(3) Occurrence of concave phenomenon: The surfaces of the artificial marble of examples 1-3 and comparative examples 1-4 are prepared by sanding with sand paper (more than #600 grit) and then the occurrence of cracks between a pattern part and the matrix or the occurrence of a fallen (sunken) pattern parts in comparison with the matrix surface is evaluated with the naked eye.

TABLE 1

| | Examples | | | Comparative Examples | | | |
|---|---|---|---|---|---|---|---|
| | 1 | 2 | 3 | 1 | 2 | 3 | 4 |
| Specific gravity of pattern part | 1.644 | 1.647 | 1.668 | 1.672 | 1.191 | 1.667 | 1.194 |
| Transparency of pattern part | 97% | 95% | 92% | 28% | 98% | 64% | 92% |
| Concave phenomenon | good | good | good | good | bad | good | bad |

As shown in Table 1, comparative example 1 using an excessive amount of filler exhibits increased specific gravity without the occurrence of the concave phenomenon, however, the transparency of the pattern part significantly deteriorated.

Comparative example 2 using a small amount of filler excluding the binder exhibits the concave phenomenon (pattern part floating) because of the low specific gravity of the patterns parts and because the pattern parts shrank more than the matrix.

Comparative example 3 using an excessive amount of inorganic filler for high specific gravity and introducing the method for controlling the refractive ratio of inorganic filler at the level of the base resin, illustrates that it is difficult to obtain excellent transparency due to the effect of the inorganic filler size.

Comparative example 4 illustrates that it is difficult to prevent the concave phenomenon and to obtain a particular specific gravity without including a halogenated compound having a high specific gravity.

In contrast, examples 1 to 3 exhibit a transparency of more than 70% and a specific gravity of more than 1.60 without the occurrence of the concave phenomenon.

Many modifications and other embodiments of the invention will come to mind to one skilled in the art to which this invention pertains having the benefit of the teachings presented in the foregoing descriptions. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation, the scope of the invention being defined in the claims.

What is claimed is:

1. An artificial marble having an amorphous pattern comprising a matrix and a pattern part, wherein said pattern part has a specific gravity of about 1.6 to about 2.0, and wherein said pattern part comprises a cured pattern part forming resin composition (A) comprising a binder, an acrylic polymerizable monomer, and an inorganic filler in an amount of about 0.1 to about 15 parts by weight based on about 100 parts by weight of a mixture of the binder and the acrylic polymerizable monomer.

2. The artificial marble having an amorphous pattern of claim 1, wherein said pattern part has a transparency of more than about 70%.

3. The artificial marble having an amorphous pattern of claim 1, wherein the binder comprises an halogenated urethane acrylate, halogenated epoxy acrylate, or a combination thereof.

4. The artificial marble having an amorphous pattern of claim 3, wherein the pattern part forming resin composition (A) comprises about 50 to about 90 parts by weight of the binder and about 10 to about 50 parts by weight of the acrylic polymerizable monomer, based on the total weight of the pattern part forming resin composition (A).

5. The artificial marble having an amorphous pattern of claim 3, wherein the pattern part forming resin composition (A) further comprises a reactive monomer in an amount of about 1 to about 100 parts by weight based on about 100 parts by weight of the acrylic polymerizable monomer.

6. The artificial marble having an amorphous pattern of claim 3, wherein said acrylic polymerizable monomer comprises methyl (meth)acrylate, ethyl (meth)acrylate, 2-ethylhexyl (meth)acrylate, octyl (meth)acrylate, dodecyl (meth)acrylate, octadecyl (meth)acrylate, methylcyclohexyl (meth)acrylate, isobornyl (meth)acrylate, phenyl (meth)acrylate, benzyl (meth)acrylate, chlorophenyl (meth)acrylate, methoxyphenyl (meth)acrylate, bromophenyl (meth)acrylate, ethylene glycol di(meth)acrylate, 1,2-propylene glycol (meth)acrylate, 1,3-butanediol di(meth)acrylate, 1,3-propylene glycol (meth)acrylate, 1,4-butanediol di(meth)acrylate, 1,5-pentanediol di(meth)acrylate, neopentyl glycol di(meth)acrylate, diethylene glycol di(meth)acrylate, triethylene glycol di(meth)acrylate, dipropylene glycol di(meth)acrylate, diallyl terephthalate, diallyl phthalate, diallyl carbonate, trimethylolpropane tri(meth)acrylate, pentaerythritol tri(meth)acrylate, pentaerythritol tetra(meth)acrylate, dipentaerythritol hexa(meth)acrylate, ethoxy ethoxyethyl acrylate, epoxy acrylate of glycidyl methacrylic acid, 1,6-hexanediol di(meth)acrylate, glycerol tri(meth)acrylate, methylpropanediol di(meth)acrylate, polyethylene glycol di(meth)acrylate, or a combination thereof.

7. The artificial marble having an amorphous pattern of claim 3, wherein said pattern part forming resin composition further comprises an additive comprising a colorant, defoaming agent, coupling agent, ultraviolet absorber, light diffusing agent, polymerization inhibitor, antistatic agent, flame retardant, heat stabilizer or a combination thereof.

8. A method for preparing an artificial marble having an amorphous pattern, the method comprising:

mixing a polymerizable acrylic monomer with a binder comprising a halogenated urethane acrylate, halogenated epoxy acrylate or a combination of thereof and an inorganic filler in an amount of about 0.1 to about 15 parts by weight based on about 100 parts by weight of a mixture of the binder and the acrylic polymerizable monomer to prepare a pattern part forming resin composition (A) having a specific gravity of about 1.6 to about 2.0;

dissolving polyacrylate in an acrylic monomer to prepare a matrix forming slurry (B);
non-uniformly supplying both of the pattern forming resin composition (A) and the matrix forming slurry (B) into a molding cell; and
curing the pattern part forming resin composition (A) and the matrix forming slurry (B).

9. The method of claim 8, wherein the pattern part forming resin composition (A) comprises about 50 to about 90 parts by weight of the binder and about 10 to about 50 parts by weight of the acrylic polymerizable monomer, based on the total weight of the pattern part forming resin composition (A).

10. The method of claim 8, wherein the pattern part forming resin composition (A) further comprises a reactive monomer in an amount of about 1 to about 100 parts by weight based on about 100 parts by weight of the acrylic polymerizable monomer.

* * * * *